Figure 1:
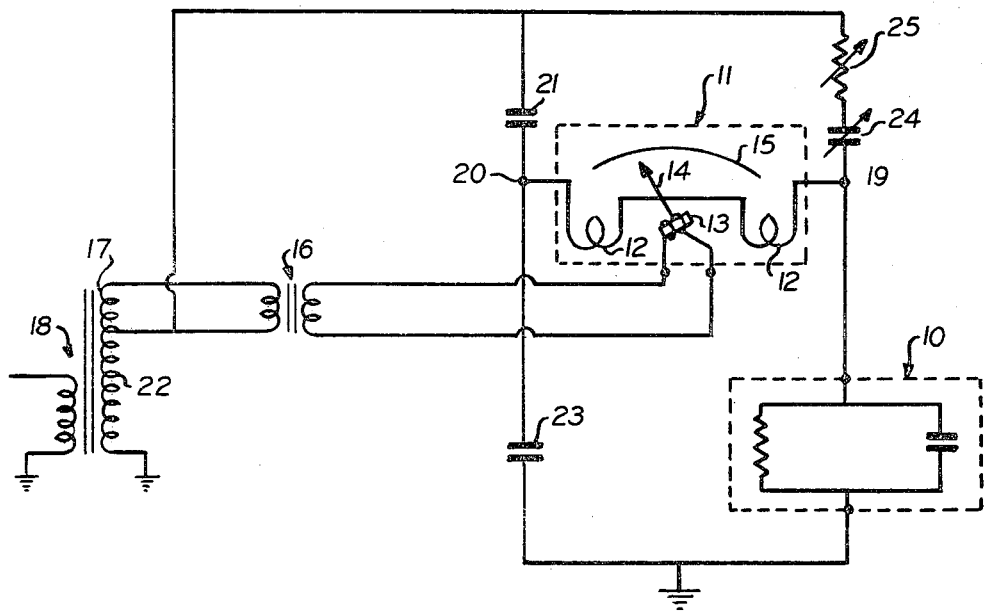

United States Patent
Bahder et al.

[15] 3,684,958
[45] Aug. 15, 1972

[54] APPARATUS INCLUDING CAPACITIVE BRIDGE CIRCUIT FOR MEASURING AC POWER LOSSES

[72] Inventors: George Bahder, Edison; Felipe G. Garcia, Scotch Plains, both of N.J.

[73] Assignee: General Cable Corporation, New York, N.Y.

[22] Filed: Sept. 23, 1970

[21] Appl. No.: 74,748

[52] U.S. Cl. ................................324/142, 324/126
[51] Int. Cl. .............................................G01r 21/00
[58] Field of Search...............324/126, 127, 141, 142

[56] References Cited

UNITED STATES PATENTS 2,681,436  6/1954  Schleicher..................324/127

*Primary Examiner*—Alfred E. Smith
*Attorney*—Sandoe, Hopgood & Calimafde

[57] ABSTRACT

Apparatus for measuring power losses in high voltage equipment, in which a relatively high capacitive current is produced, such as overhead power lines, utilizes a wattmeter and a test potential transformer. For eliminating from the current coil the effect of the capacitive component of current which is generated in the equipment under test, a variable resistor and a variable capacitor in series are connected in parallel with the current coil of the wattmeter for matching the voltage drop and capacitance of the portion of the test circuit that includes the current coil and a capacitor between the current coil and the transformer. Alternate means are shown for applying stepped down voltage from the transformer to the potential coil of the wattmeter.

3 Claims, 2 Drawing Figures

PATENTED AUG 15 1972 3,684,958

INVENTORS
George Bauder
Felipe G. Gavero
BY
Sandoe, Hopgood
& Calimafde
ATTORNEYS.

APPARATUS INCLUDING CAPACITIVE BRIDGE CIRCUIT FOR MEASURING AC POWER LOSSES

The present invention is apparatus for measuring A.C. power losses in equipment, such as overhead power lines which generate relatively high values of capacitive current.

A.C. power losses are customarily measured with testing apparatus incorporating a wattmeter, but when the current has a relatively high capacitive component compared to the resistive component, it is difficult to measure the power loss using a standard wattmeter because the capacitive component of the current would cause a large current to flow in the current or field coil of the wattmeter, and overheat the meter, while very few watts would be indicated on the scale of the meter. In order for a meter to carry the high capacitive current involved, without overheating, the current coils would have to be of heavy construction, but this would render the instrument insensitive to small values of the resistive component of the current. Hence the accuracy of the testing apparatus would be poor and it would be incapable of measuring relatively small power losses.

An object of this invention is to provide apparatus which does not have the above noted drawbacks and limitations for measuring A.C. power losses in equipment involving a relatively high, or at least a significant, capacitive current component.

Another object is to provide such apparatus, which is more sensitive than previously known apparatus, for measuring A.C. power losses in high voltage overhead lines or in other high voltage equipment in which there is a significant or relatively high capacitive current component.

A further object is to provide such apparatus which is adapted for accurately measuring A.C. power losses at either high or low voltages.

These and other objects are accomplished with apparatus in accordance with this invention which suitably includes a standard wattmeter of conventional construction and in which the current coils of the wattmeter are connected in a bridge circuit configuration that is adapted to be balanced so that the capacitive current flowing through the equipment under test will not flow through the wattmeter's current coils. Thus the only current flowing in the current coils will be a function of the resistive loss component of the current through the equipment. Consequently, the apparatus can incorporate a very sensitive wattmeter without risk of its current coils being damaged.

Figure 2:
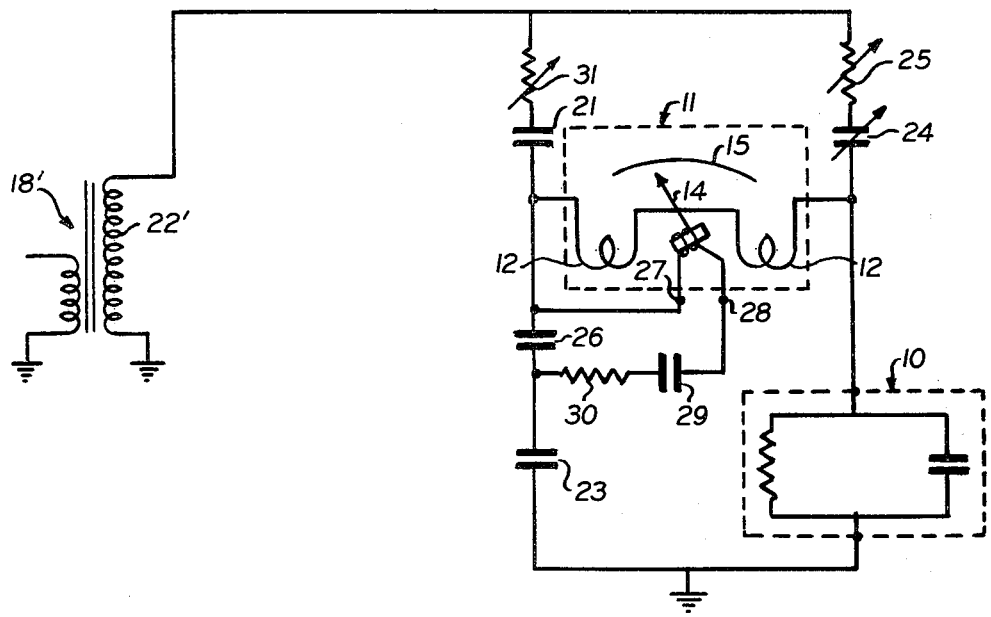

The invention is described in more detail below with reference to the illustrative embodiments shown in the accompanying drawings in which:

FIG. 1 is a schematic diagram of the elements and circuit configuration of apparatus in accordance with this invention, which incorporates a wattmeter and a test potential transformer having a tertiary winding coupled for supplying stepped-down power to the potential coil of the wattmeter, and FIG. 2 is a schematic diagram of an alternative structure and circuit configuration wherein power for the potential coil of the wattmeter is derived from the secondary coil of a test potential transformer through a voltage dividing configuration.

Referring to the drawings, 10 designates an overhead power line, or other capacitive equipment, connected to apparatus of this invention which is adapted to measure the A.C. power losses therein.

The embodiment of the apparatus shown in FIG. 1 includes a conventional wattmeter 11 having a pair of current coils 12 in series and a potential coil 13 carried on a pivotally supported pointer element 14 associated with a Watt scale 15.

Power for the potential coil 13 is supplied through a step-down transformer 16 from a tertiary winding 17 of a test potential transformer 18.

The current coils 12 are connected at one side 19 to one side of the equipment 10 being tested; at their other side 20 they are coupled through a first capacitor 21 to the secondary winding 22 of the test potential transformer 18 and second high voltage, loss-free capacitor 23 to ground. The other side of the equipment is also connected to ground.

As shown, a variable capacitor 24 and a variable resistor 25, which are in series, are connected in parallel with the current coils 12 and the first capacitor 21. The portion of the circuit through the current coils 12 and first capacitor 21 and the portion through the variable capacitor 24 and variable resistor 25 are thus in parallel between the secondary winding 22 of the test transformer 18 and the equipment 10 under test and form two arms of a capacitive bridge. Thus, by adjusting the variable capacitor 24 and variable resistor 25 to match the voltage drop and capacitance of the circuit portion through the current coils 12 and first capacitor 21 so that the potential is the same through both arms, the capacitive component of the current through the equipment is balanced out of the portion of the circuit through the current coils 12. Consequently, the only current flowing in the current coils 12 will be a function of the resistive loss component of the current flowing in the equipment 10 so that a very sensitive wattmeter 11 can be used to provide accurate readings of very small resistive current components and the current coils 12 will not be subject to damage by overheating.

FIG. 2 shows alternative arrangement wherein power for the potential coil 13 is drawn from the secondary winding 22' of a test potential transformer 18' which does not have a tertiary winding. In this instance the voltage to the potential coil 13 is stepped down by a voltage dividing configuration as shown. For this purpose a third capacitor 26 is connected in series between the current coils 12 and the second capacitor 23 and one side 27 of the potential coil 13 is connected between the third capacitor 26 and the current coils 12. The other side 28 of the potential coil 13, having a fourth capacitor 29 and a resistor 30 in series therewith, is connected between the second and third capacitors 23 and 26. A second variable resistor 31 is connected in series between the first capacitor 21 and the secondary coil 22' of the test transformer 18' in position such that it — with the first capacitor 21 and the current coils 12 — is in parallel with the variable capacitor 24 and variable resistor 25. The remainder of the circuit configuration of this FIG. 2 embodiment and the manner of balancing out the capacitance generated in the equipment 10, is otherwise the same as in the FIG. 1 embodiment as described above.

What is claimed is:

1. Apparatus for measuring A.C. power losses in high voltage equipment in which a significant capacitive current component is produced, comprising a wattmeter having a current coil and a potential coil, said current coil having one side adapted to be connected to said equipment, a potential transformer connected for supplying power through the current coil of the wattmeter to said equipment, means for supplying stepped down voltage from the transformer to the potential coil of the wattmeter, a first capacitor in series between the other side of said current coil and the transformer, a second, high voltage, loss-free capacitor in series between said other side of the current coil and ground, and a variable resistor and a variable capacitor, in series, connected in parallel with the current coil of the wattmeter and said first capacitor for matching the voltage drop and capacitance of the portion of the circuit through said current coil and first capacitor whereby a capacitive component of current through said equipment is eliminated in the portion of the circuit through said current coil.

2. The apparatus of claim 1 in which said transformer includes a tertiary winding, and in which said means for supplying stepped down voltage to said potential coil comprises a step-down transformer coupled between said tertiary winding and said potential coil.

3. The apparatus of claim 1 in which said means for supplying stepped down voltage to said potential coil comprises a third capacitor connected in series between said other side of the current coil of the wattmeter and said second capacitor; and a resistor and a fourth capacitor in series with the potential coil of the wattmeter, the latter resistor, the fourth capacitor and said potential coil being connected between a point between said second and third capacitors and said other side of said current coil; and which includes a second variable resistor in series between the first capacitor and the transformer, said second variable resistor being in parallel with the first said variable resistor and said variable capacitor.

* * * * *